United States Patent [19]

Crutchfield

[11] 4,197,817
[45] Apr. 15, 1980

[54] RETRACTABLE DOG LEASH

[76] Inventor: Billy G. Crutchfield, Rte. 1, Bruce, Mich. 38915

[21] Appl. No.: 918,831

[22] Filed: Jun. 26, 1978

[51] Int. Cl.² ............................................. A01K 27/00
[52] U.S. Cl. ..................................................... 119/109
[58] Field of Search .......................... 119/96, 106, 109

[56] References Cited

U.S. PATENT DOCUMENTS

| | | | |
|---|---|---|---|
| 870,784 | 11/1907 | Huff | 119/106 |
| 2,222,409 | 11/1940 | Gottlieb | 119/109 X |
| 2,919,676 | 1/1960 | Schneider | 119/106 X |
| 3,942,738 | 3/1976 | Rutty | 242/107.3 X |
| 4,018,189 | 4/1977 | Umphries et al. | 119/109 |

Primary Examiner—Louis G. Mancene
Assistant Examiner—Robert P. Swiatek
Attorney, Agent, or Firm—Clarence A. O'Brien; Harvey B. Jacobson

[57] ABSTRACT

A device which can be attached to the collar of a dog or other pet which device contains all the elements of a leash necessary for walking the animal. A spool is disposed in a housing and connected thereto by an axle member which runs through the center of the spool. A spring is disposed in the center of the spool and connected to the axle and spool so as to impart rotary motion to the spool. A leash is connected at one end to the spool and at the other end to a foldable handle. When allowed to run free, the spool rotates by action of the spring, thus coiling the leash thereon until the handle makes contact with the housing. The handle is folded around the housing in a groove provided therefor. The handle may be pulled away from the housing and the leash uncoiled to the desired length whereupon a small cam is wedged between the spool and the housing thus stopping of the motion of the spool.

1 Claim, 6 Drawing Figures

U.S. Patent  Apr. 15, 1980  Sheet 1 of 2  4,197,817
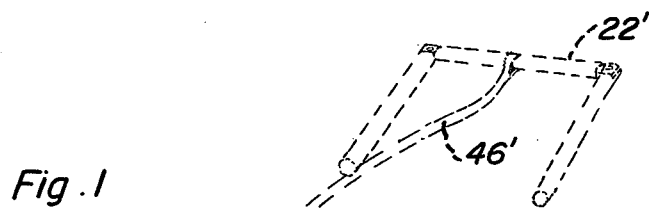
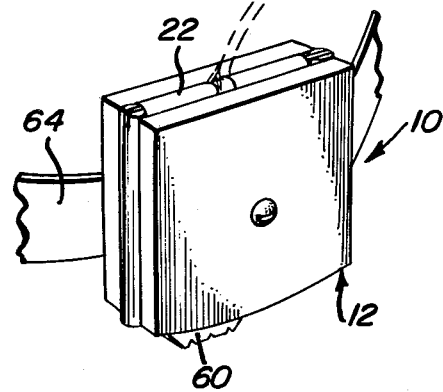
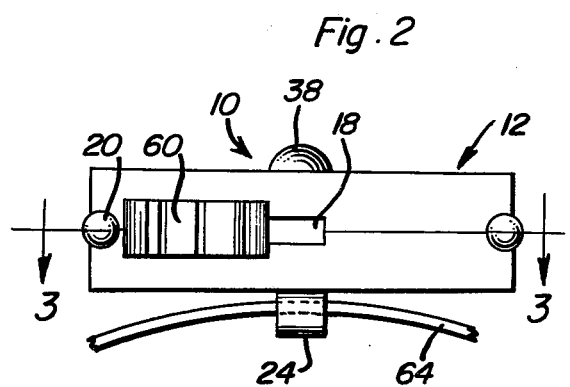
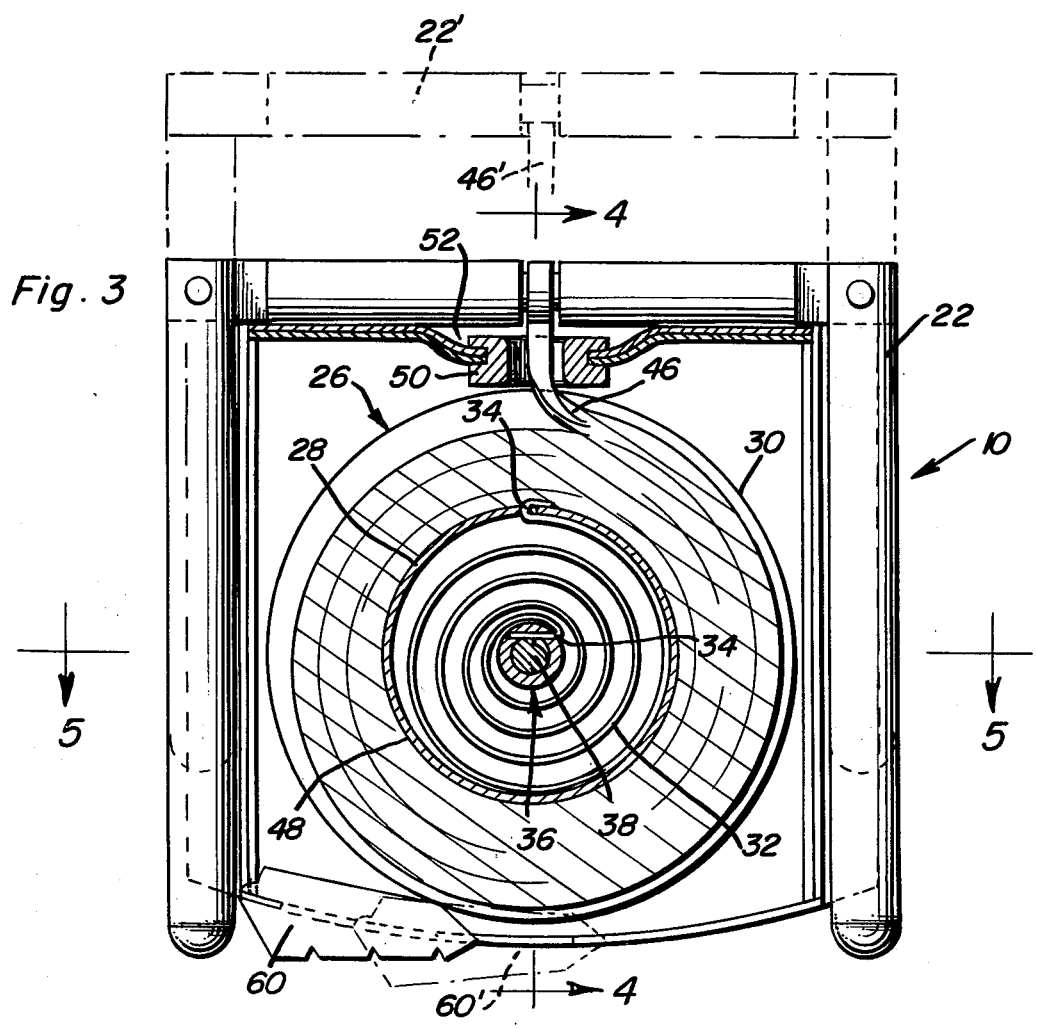

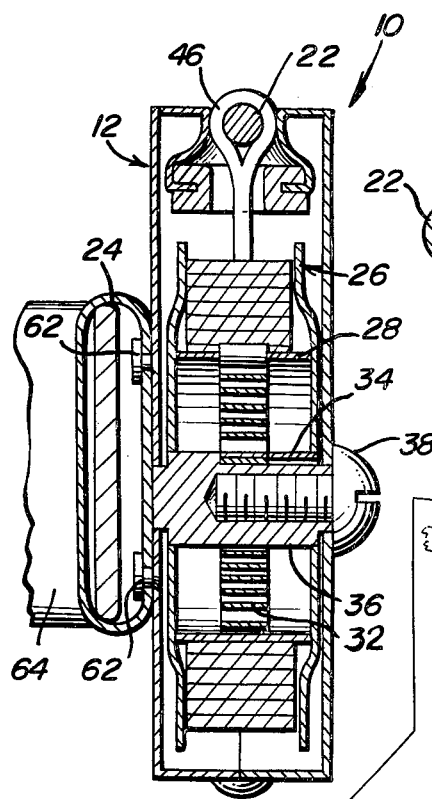
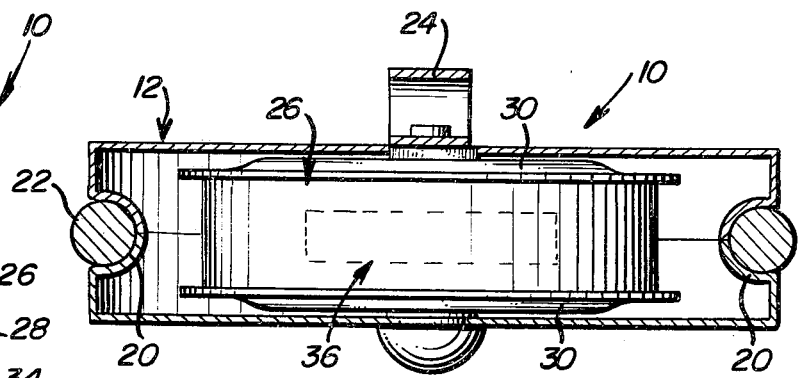
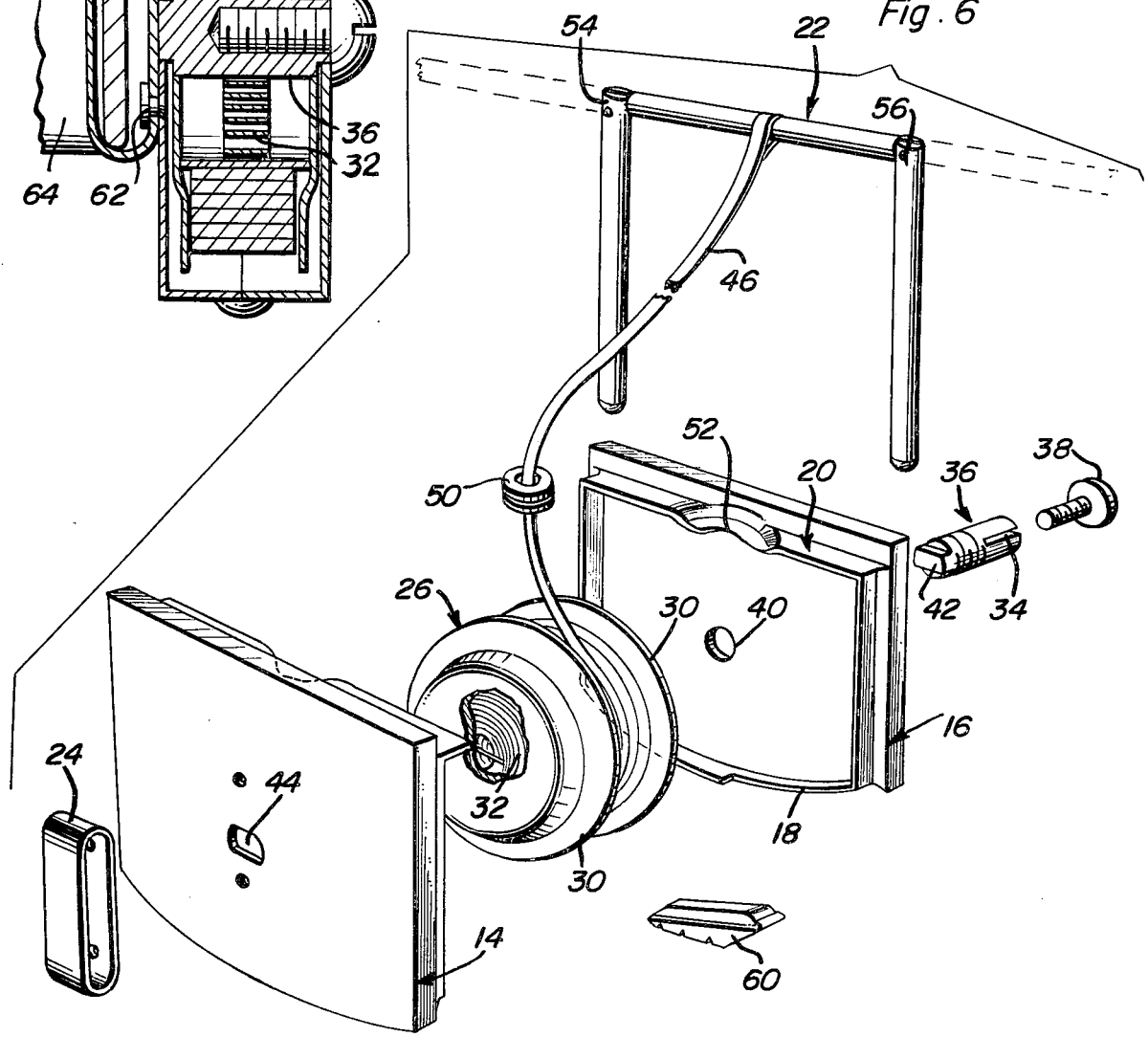

RETRACTABLE DOG LEASH

BACKGROUND OF THE INVENTION

1. Field of the Invention

This invention relates in general to leash devices, and more particularly to a retractable leash device suitable for attachment to collars of dogs and other animals.

2. Description of the Prior Art

Leashes for animals and particularly leashes having a retractable feature as part of the over-all device have been known and used for many years. These prior art devices, however, do not make any provision for the storage of the container for the reeled in leash. That is, if it were the leash reeled into its container, the entire device is not readily available to the user when needed. A user must obtain the device and hook one end of the device onto the collar of the animal to be restrained. Examples of these type of devices include U.S. Pat. No. 3,937,418 to Critelli, U.S. Pat. No. 3,853,283 to Croce, et al., U.S. Pat. No. 3,693,596 to Croce, et al., and U.S. Pat. No. 3,233,591 to Rogers, et al.

SUMMARY OF THE INVENTION

In the event that a pet is left to run free and is suddenly struck with an urge to roam, a convenient method of restraint is desirable. Quite often pets do not wish to allow their masters to attach leashes to their collars and wiggle and writhe in order to avoid this unfortunate circumstance. The device of this invention solves the problem by providing the user with a convenient leash already attached to the dog's collar whereby all one has to do is reach down and firmly grasp the handle thereof to restrain his pet.

Another object of the invention is to provide the user with a leash which can be easily located as it is always available on the neck of the pet.

A further object of the invention is to provide a retractable pet leash which is simple in function and economical in design. The simplicity of the leash and retractor mechanism make it such that a small, light weight and effective device is produced which can be maintained on a pet's body without disturbing the pet.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the retractable leash.

FIG. 2 is a bottom view of the retractable leash.

FIG. 3 is a sectional view taken substantially along a plane passing through section line 3—3 of FIG. 2.

FIG. 4 is a sectional view taken substantially along a plane passing through section line 4—4 of FIG. 3.

FIG. 5 is a sectional view taken substantially along a plane passing through section line 5—5 of FIG. 3.

FIG. 6 is an exploded, perspective view of the retractable leash device.

DESCRIPTION OF THE PREFERRED EMBODIMENT

With reference to the drawings, the retractable leash device of this invention is generally referred to by the numeral 10. The device 10 includes a housing 12 which consists of two halves 14 and 16 as seen in FIG. 6. The housing 12 is of generally rectangular shape with an arcuate lower edge which contains slot 18 which communicates with the interior of the housing. The two halves of the housing fit together and form on three sides thereof a recessed groove or channel 20 as can best be seen in FIGS. 5 and 6. This channel 20 is designed to receive the foldable handle 22. The housing 12 also has disposed on the inner portion thereof, a solid loop 24 through which the pet collar should be passed in order to attach the retractable leash device thereto. Loop 24 can best be viewed with reference to FIGS. 2, 4, 5 and 6.

The working mechanism of the device includes spool 26 which is disposed within the housing 12. The spool 26 may be made of metal, or any light weight plastic material. Spool 26 has an inner cylindrical support surface 28 on which the leash of the mechanism may be wound. The spool also has two circular side panels 30 on each end of the cylindrical support 28. Confined within the space within the two circular side panels and the cylindrical support is spring 32. Spring 32 is affixed to the cylindrical support 28 by means of a recurved end 34 which passes through a small opening in the cylindrical support 28 provided therefor. The opposite end of the spring 32 also has a recurved portion which passes through a slot 34 disposed in axle 36 as seen in FIGS. 3 and 6. Axle 36 is attached to housing half 16 by a threaded engagement with screw 38 which passes through a hole disposed in 16 indicated at 40 in FIG. 6. With axle 36 disposed on the inner portion of the housing and the head of screw 38 disposed on the outer portion of the housing, the axle is firmly secured thereto. On the opposite end of axle 36 is a key portion 42 which fits in a slot 44 provided therefor in housing half 14. In this manner rotational motion of the axle 36 is prevented by the key 42, thus enabling slot 34 to hold one end of the spring 32 and allowing spring 32 to impart a torque to spool 26.

Leash 46 is attached at one end to the cylindrical support 28 by means of, for instance, knot 48, as shown in FIG. 3. The leash extends out of housing 12 through grommet 50 which is disposed in a depressed portion of the housing shown at 52 provided therefor. The opposite end of leash 46 is attached to the center of handle 22.

Handle 22 is composed of three sections, each pivotable with respect to the others. As can be seen in FIG. 6, each of the three sections of handle 22 are approximately equal in length and are connected at joints 54 and 56. In the collapsed position, the outer ends of handle 22 are positioned at 90° to the central portion thereof, and the entire handle is positioned in groove 20 of the housing 12, as can most clearly be seen in FIGS. 1 and 3.

By reference again to FIGS. 1 and 3, it can be seen that handle 22 may be removed from its position on housing 12, pulling the leash 46 therewith. This is indicated by the phantom elements labelled 22' and 46'. When the desired length of leash has been removed, rotation of spool 26 is inhibited by wedge lock 60. Wedge lock 60 is disposed in slot 18 on the lower curved peripheral surface of the housing 12. When not in use, wedge 60 is normally disposed to the left as viewed in FIG. 3. When it is desired to stop rotation of spool 26 caused by the torque imparted thereon by spring 32, wedge lock 60 is urged to the center of the curved surface of housing 12 and is thereby forced against and between the circular side panels 30 of spool 26. In this manner, wedge lock 60 is made to exert an equal and opposite torque on spool 30 to that produced by the spring 32.

The housing 12 is connected to loop 24 by means of rivets 62. These rivets are disposed in holes in the housing which are made therefor. Loop 60 is designed to be of sufficient size to fit conveniently about a pet collar 64 as shown in FIGS. 1, 2 and 4. In this manner, the leash of the device is conveniently ready for use anytime the user desires.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A leash apparatus for storing a leash in a compact configuration, comprising: a leash, container means having a spool rotatably mounted therein, said spool being connected to one end of said leash; spring means attached to said spool so as to impart a torque to said spool to force said spool to rotate in a manner coiling said leash thereon; a wedge-shaped latch element slidably disposed in a slot in said container means and adapted to make a pressure tight detachable engagement with said spool so as to impart a torque to said spool which is equal to and opposite to the torque imparted by said spring means; a handle firmly secured to said leash at the opposite end thereof, said handle including pivotable sections capable of folding for making said handle conform to the shape of at least a portion of the periphery of said container means to provide for convenient storage of said handle; and a groove disposed about a portion of the periphery of said container means for receiving said handle therein.

* * * * *